United States Patent [19]

Rowe

[11] 4,271,857
[45] Jun. 9, 1981

[54] FIRE SAFE VALVE

[75] Inventor: Frederick G. Rowe, Pudsey, England

[73] Assignee: Cameron Iron Works, Inc., Houston, Tex.

[21] Appl. No.: 63,157

[22] Filed: Aug. 2, 1979

[30] Foreign Application Priority Data

Apr. 30, 1979 [GB] United Kingdom ............... 14878/79

[51] Int. Cl.³ .............................................. F16K 13/00
[52] U.S. Cl. ....................................... 137/73; 137/75; 251/63.6; 251/330
[58] Field of Search ............... 137/72, 73, 75; 251/63, 251/63.5, 63.6, 326, 330

[56] References Cited

U.S. PATENT DOCUMENTS

| 2,647,721 | 8/1953 | Volpin | 137/72 |
| 3,177,887 | 4/1965 | Priese | 137/74 |
| 3,659,624 | 5/1972 | Kelley et al. | 137/72 |
| 3,771,540 | 11/1973 | Wicke | 137/75 |
| 3,788,600 | 1/1974 | Allen | 137/74 |
| 3,838,705 | 10/1974 | Diehl et al. | 137/75 |
| 3,842,853 | 10/1974 | Kelley et al. | 137/72 |
| 3,896,835 | 7/1975 | Wicke | 137/75 |
| 4,214,600 | 7/1980 | Williams, Jr. et al. | 137/72 |

Primary Examiner—Martin P. Schwadron
Assistant Examiner—G. L. Walton
Attorney, Agent, or Firm—Vinson & Elkins

[57] ABSTRACT

A fire safe valve having a valve body with a flow passage therethrough and a valve chamber intersecting the flow passage a valve closure member having a stem and being slidable in the valve chamber to open or close flow through the flow passage, a shoulder on the stem, a bonnet connected to the body, said bonnet having a bore through which the stem extends, a seat surrounding the stem and adapted to be engaged by the stem shoulder on backseating, means sealing between the stem and the bonnet bore outward of said seat, an actuator connected to move said stem and said valve closure member, a sleeve surrounding a portion of the stem, fusible material supporting the sleeve in a normal stop position to limit the outward movement of the stem to prevent backseating, melting of the fusible material allowing the sleeve and stem to move so that the stem backseats, and means associated with said sleeve to control the actuator whereby on movement of the sleeve the valve closure member is moved to closed position.

7 Claims, 6 Drawing Figures

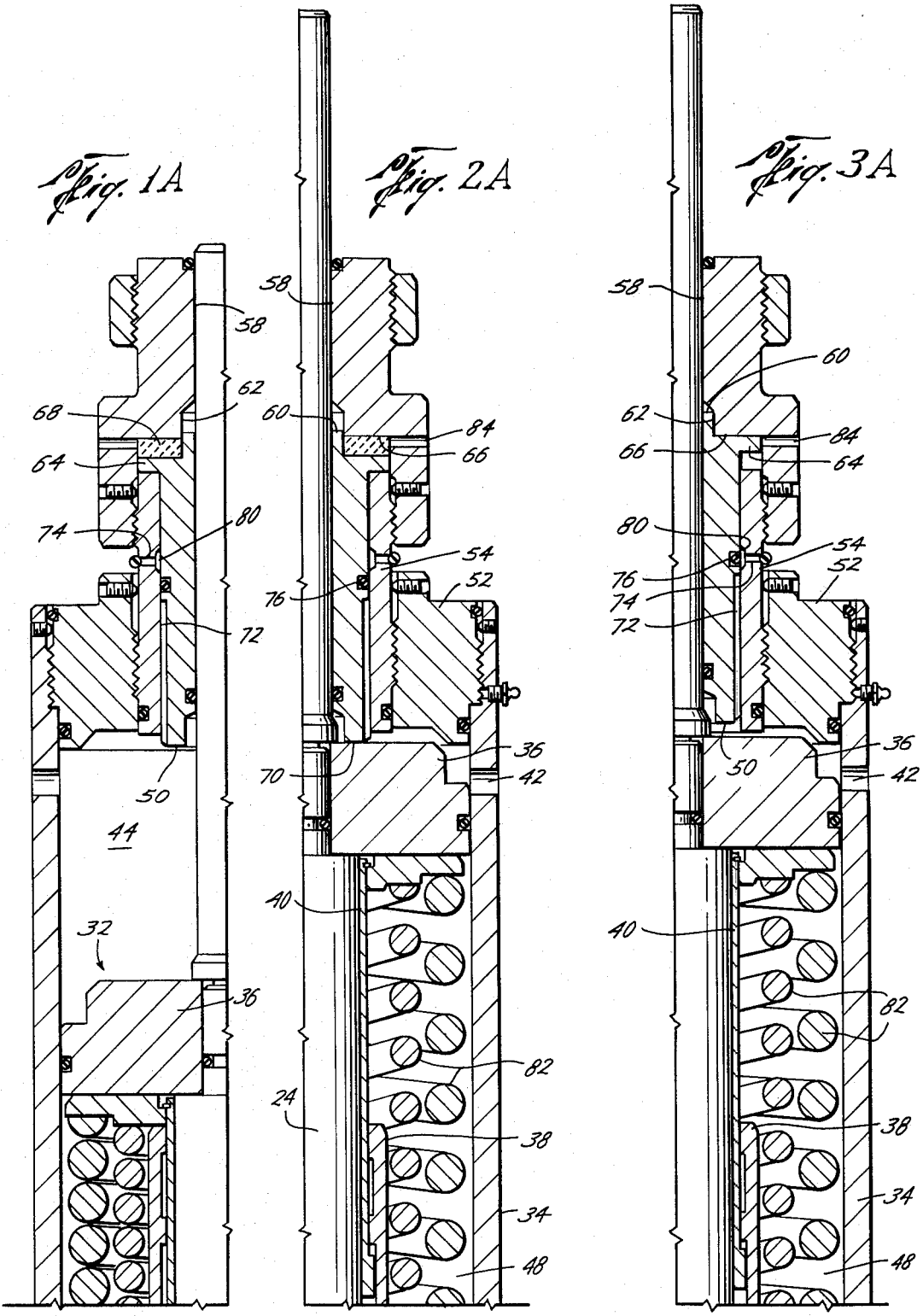

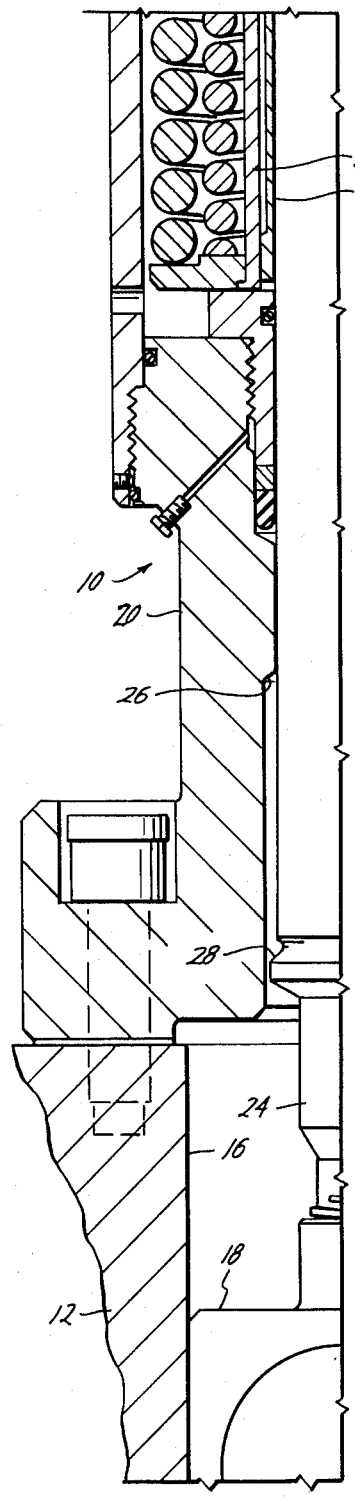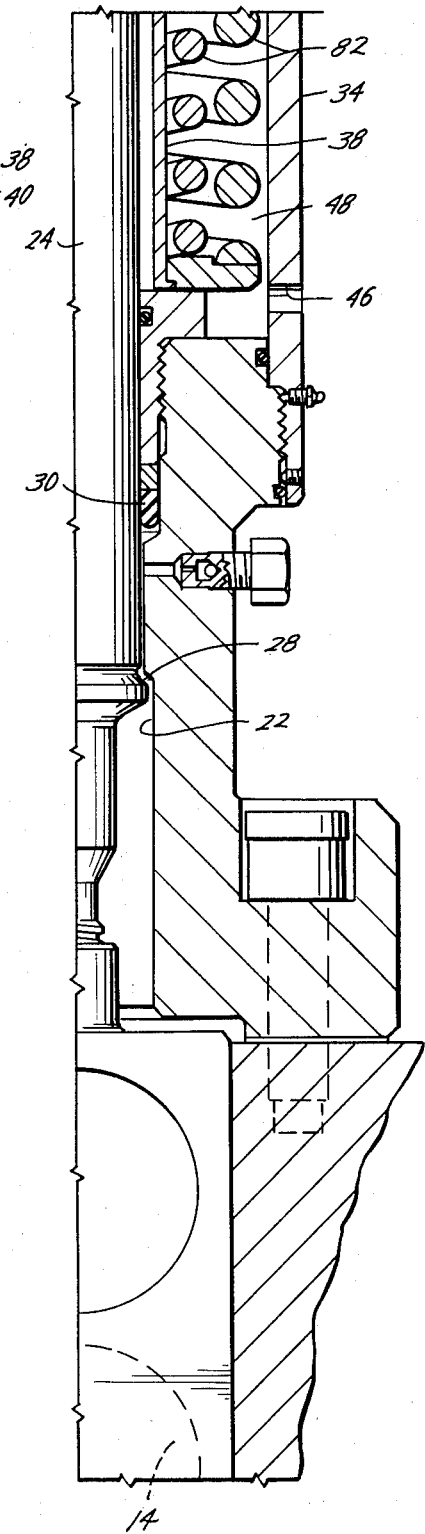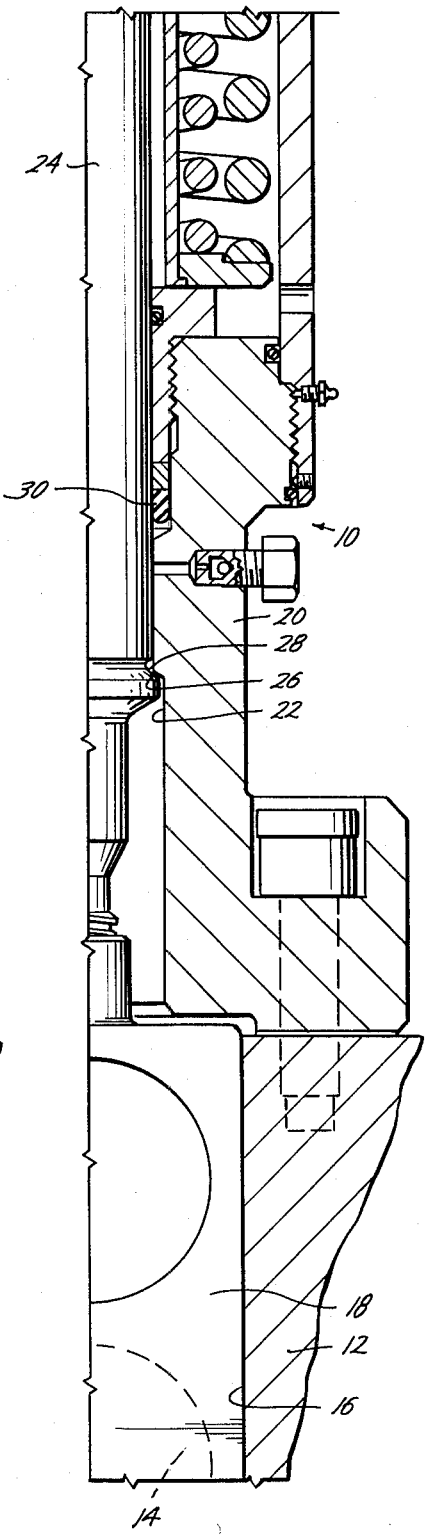

FIRE SAFE VALVE

BACKGROUND

Efforts have been made in the past to include fusible elements in stem operated valves so that leakage around the stem could be prevented by a metal-to-metal stem seal when the valve was subjected to fire. The H. Allen U.S. Pat. No. 3,788,609, the A. S. Volpin U.S. Pat. No. 2,647,721 and the W. M. Kelly et al U.S. Pat. No. 3,842,853 are examples of such prior structures.

The Allen Patent discloses a gate valve with a two-piece stem, the outer section of which telescopes with respect to the inner section. The outer section has a metal sealing shoulder which is held apart from a metal seat, located in the cap, by a fusible member. In the event of a fire, a metal-to-metal seal is formed between the stem shoulder and cap seat. This will effectively control the line fluid; however, the cap must be made excessively large since it will be exposed to the high pressure of the line fluid.

The A. S. Volpin patent discloses a valve with a fusible element supporting the bearing so that a shoulder on the stem engages a seat on the interior of the bonnet when the fusible element melts due to fire. This structure positions the stem packing on the outer end of the stem where it is more subject to heat than the fusible element and could fail before the fusible element to allow escape of fluids around the stem which are flowing through the valve and which fluids may feed the fire or complicate the fire fighting. Further, Volpin makes no provision for draining the melted material from the bonnet. Also, Volpin, as does Allen, requires the cap to be strong enough to contain the high pressure line fluid.

The W. M. Kelly et al Patent discloses a heat responsive safety valve in which the gate is held in open position by fusible material at the outer end of the stem retaining the stem from axial movement. The occurrence of a fire melts the fusible material and responsive to a spring load the stem and gate move to close passage through the valve. There is no provision for a metal-to-metal sealing around the stem inward of the O-ring stem seal. Failure of such O-ring seal could lead to the leakage of fluids from the valve around the stem even though the gate had moved to closed position.

Another prior art structure is disclosed in the Leonard E. Williams, Jr., U.S. Pat. application Ser. No. 12,383, filed Feb. 15, 1979, now U.S. Pat. No. 4,214,600, wherein the fusible material supports the outer end of the stem within a cap and the cap has holes through which the melted fusible material exits.

None of the known prior art provides a stop to the stem and valve closure member movement to prevent backseating during normal operations and assures backseating on melting of the fusible material supporting the stop. Further, none of these references assure that the flow through the flow passage is closed when there is a fire.

Most fire safe valves have used a eutectic mixture which melts at a preselected temperature to support the valve stem in a normal position allowing the stem to backseat when the mixture melts.

SUMMARY

The present invention relates to an improved fire safe valve, i.e., a valve which, when exposed to fire or excessive heat, closes to provide a fire resistant metal-to-metal seal to contain the fluids within the valve body.

An object of the present invention is to provide an improved fire safe valve which not only causes the stem to backseat when exposed to fire or excessive heat but automatically closes the valve.

Another object of the present invention is to provide an improved fire safe valve having an adjustable setting to stop the valve member and stem in a normally closed position without backseating of the stem.

A further object is to provide an improved fire safe valve in which the incidence of a fire of excessive high temperatures causes the actuator to be relieved of operating pressure fluid to assure closing of the valve together with backseating of the stem.

BRIEF DESCRIPTION OF THE DRAWINGS

The improved fire safe valve of the present invention is shown in the drawings wherein:

FIG. 1 is a longitudinal sectional view of the improved valve of the present invention in the open position with FIG. 1A being the operator portion and FIG. 1B being the valve body portion of FIG. 1.

FIG. 2 is a similar view showing the valve in closed position with FIG. 2A being the operator portion and FIG. 2B being the body portion.

FIG. 3 is a partial longitudinal sectional view showing the closing of the improved valve of the present invention and with the stem backseated. FIG. 3A shows the operator portion of FIG. 3 and FIG. 3B shows the valve body portion.

DESCRIPTION OF THE PREFERRED EMBODIMENT

The improved fire safe valve 10 of the present invention includes body 12 having flow passage 14 extending therethrough and valve chamber 16 intersecting flow passage 14 so that valve closure member 18 when positioned in valve chamber 16 is slidable from a lower position opening flow through passage 14 to an upper position closing flow through passage 14. Bonnet 20 is secured to body 12 around the opening of valve chamber 16. Bonnet 20 has bore 22 extending therethrough with valve stem 24 extending from valve member 18 through bore 22 as shown. Bore 22 is interrupted by seat 26 which faces valve member 18 and is adapted to receive shoulder 28 on stem 24 for backseating to provide a metal-to-metal seal to contain the fluids within the body 12.

Stem 24 is moved axially by actuator 32. Actuator 32 includes outer housing 34 secured to bonnet 20, annular piston 36 secured to stem 24, tubular mandrel 38 extending outward from bonnet 20 and sliding sleeve 40 sliding with the movement of piston 36 within tubular mandrel 38. Port 42 is in communication with piston chamber 44 on the outer side of piston 36 and port 46 is in communication with piston chamber 48 on the inner side of piston 36. Pressure fluid applied to port 42 moves piston 36, stem 24 and valve member inward to the position shown in FIG. 1. Pressure fluid applied to port 46 moves piston 36, stem 24 and valve member 18 outwardly to the position shown in FIG. 2. When pressure is applied to one port the other port is vented.

As shown in FIG. 2, piston 36 is in engagement with piston stop sleeve 50. Collar 52 is secured to the outer end of housing 34 and tubular adjusting adapter 54 is threaded into collar 52. Cap 56 is threaded onto the outer portion of adjusting adapter 54 and includes bore 58 through which stem 24 extends. Piston stop sleeve 50 has annular projection 60 on its outer end which is received in counterbore 62 of cap 56 and radial flange 64 which is normally spaced from inner surface 66 of cap 56 by fusible material 68 formed in the shape of a ring surrounding projection 60.

Piston stop sleeve 50 is positioned by rotating tubular adjusting sleeve 54 to thread it inwardly or outward to thereby position inner end 70 of sleeve 50 at the desired outer limit of the normal movement of piston 36.

The outer surface of piston stop sleeve 50 is spaced from the inner surface of tubular adjusting adapter 54 to form a vent passage 72 communicating from chamber 44 to vent port 74 extending through tubular adjusting adapter 54. Passage 72 is normally closed by seal ring 76 positioned in groove 78 around the exterior of piston stop sleeve 50. Groove 80 extends around the interior of tubular adjusting adapter 54 in communication with port 74 so that when fusible material 68 melts and piston stop sleeve 50 moves to the position shown in FIG. 3, seal ring 76 moves to groove 80 releasing the seal across vent passage 72 and venting pressure from piston chamber 44. With pressure vented from piston chamber 44, piston ring 36 moves outward closing flow through passage 14. Actuator springs 82 urge piston 36 outward and the fluid pressure in passage 14 and valve chamber 16 also urge stem 24 and piston 36 outward.

On melting of fusible material 68 it is free to flow out ports 84 in cap 56. Piston stop sleeve 50 moves outward responsive to any one or a combination of the following forces: force due to pressure in piston chamber 44; force on valve stem 24 due to pressure in flow passage 14 and valve chamber 16; and force due to actuator springs 82.

The movement of piston stop sleeve 50 provides for venting of chamber 44 and allows piston ring 36 and stem 24 to move past the normal stop position to cause stem shoulder 28 to backseat on seat 26. This backseating provides a fire resistant metal-to-metal seal.

It is intended that the fluid used for operating actuator 32 be non-flammable so that when it is vented through passage 72 and port 74 it does not ignite or in any way support combustion.

What is claimed is:

1. A fire safe valve comprising
a valve body having a flow passage therethrough and a valve chamber intersecting the flow passage,
a valve member slidable in said valve chamber to open and close flow through the flow passage,
a stem connected to the valve member and having a shoulder thereon,
a bonnet secured to said body and having a bore through which said stem extends and a seat surrounding said stem,
means for sealing between said stem and said bonnet bore positioned outward from said seat,
an actuator connected to said stem to optionally move said valve member axially to open and closed position,
a sleeve surrounding said stem,
a fusible material supporting said sleeve in a normal stop position to be engaged by said actuator whenever said valve member is in closed position,
melting of said fusible material responsive to fire or excess heat allowing said sleeve to move outward from its normal stop position, and
means associated with said sleeve for insuring movement of said actuator and valve member to closed position, on melting of said fusible material and movement of said sleeve, to close flow through said flow passage and to move said stem to backseated position with said stem shoulder on said bonnet bore seat to provide a fire resistant metal-to-metal seal around said stem to contain the fluids in said flow passage.

2. A fire safe valve according to claim 1 wherein
said actuator is pressure responsive and has a chamber, and a vent passage from said chamber,
said stop sleeve closing flow through said vent passage in its normal stop position and opening flow through said vent passage when it has moved from its stop position after melting of said fusible material to assure that said actuator moves to close flow through said body flow passage.

3. A fire safe valve according to claims 1 or 2 including an adjusting adapter associated with said stop sleeve to preselect the stop position of said stop sleeve after said fusible material is in place.

4. A fire safe valve according to claim 1 wherein
said actuator has a housing having a cylinder with a piston slidable therein,
said housing being connected to said bonnet,
a collar connected to the outer end of said housing and
means connected to said collar for supporting said fusible material and said stop sleeve in its desired stop position for engaging said piston when it has moved to the valve member closed position.

5. A fire safe valve according to claim 1 including
means for adjusting the position of said stop sleeve with respect to said bonnet to assure that said stem shoulder remains spaced a preselected distance from said bonnet bore seat, and
said actuator moving means including,
a vent port communicating from said actuator to the exterior of the bonnet,
said sleeve in its stop position closing flow through said vent port,
melting of said fusible material allowing said sleeve to move away from its stop position to vent said actuator through said vent port and allow said stem to move to bring said stem shoulder into engagement with said bonnet bore seat to provide the fire resistant metal-to-metal seal.

6. A fire safe valve comprising
a valve body having a flow passage therethrough and a valve chamber intersecting the flow passage,
a valve member slidable in said valve chamber to open and close flow through the flow passage,
a stem connected to the valve member and having a shoulder thereon,
a bonnet secured to said body and having a bore through which said stem extends and a seat surrounding said stem,
means for sealing between said stem and said bonnet bore positioned outward from said seat,
an actuator connected to said stem to optionally move said valve member axially to open and closed position,
a sleeve surrounding said stem,
a fusible material supporting said sleeve in a normal stop position to be engaged by means on said stem whenever said valve member is in closed position,
melting of said fusible material responsive to fire or excess heat allowing said sleeve to move outward from its normal stop position, and means associated with said sleeve for insuring movement of said actuator and valve member to closed position, on melting of said fusible material and movement of said sleeve, to close flow through said flow passage and to move said stem to back-seated position with said stem shoulder on said bonnet bore seat to provide a fire resistant metal-to-metal seal around said stem to contain the fluids in said flow passage.

7. A fire safe valve according to claim 6 wherein said actuator is pressure responsive and has a chamber, and a vent passage from said chamber, said stop sleeve closing flow through said vent passage in its normal stop position and opening flow through said vent passage when it has moved from its stop position after melting of said fusible material to assure that said actuator moves to close flow through said body flow passage.

* * * * *